R. CRAIG.
Cultivator.
No. 27,406. Patented Mar. 6, 1860.
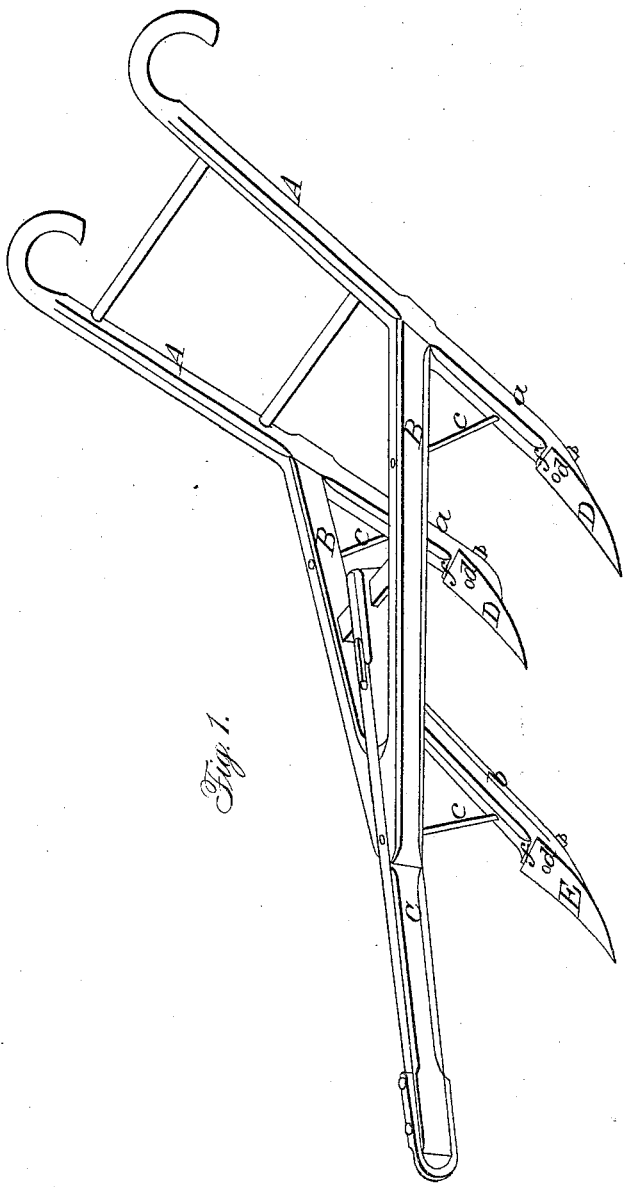
Witnesses:
H.W. Coombs.
R.S. Spencer
Inventor:
Robt Craig
per Munn & Co
attornys

UNITED STATES PATENT OFFICE.

ROBERT CRAIG, OF STATE LINE CITY, INDIANA, ASSIGNOR TO HIMSELF AND J. D. LUDLOW, OF SAME PLACE.

IMPROVEMENT IN CULTIVATORS.

Specification forming part of Letters Patent No. 27,406, dated March 6, 1860.

*To all whom it may concern:*

Be it known that I, ROBERT CRAIG, of State Line City, in the county of Warren and State of Indiana, have invented a new and Improved Cultivator; and I do hereby declare that the following is a full, clear, and exact description of the same, reference being had to the annexed drawings, making a part of this specification, in which—

Figure 1 is a perspective view of my invention; Fig. 2, a detached perspective view of one of the beveled keys by which the shares are adjusted; Figs. 3, 4, and 5, horizontal sections of the shares, feet, and keys of the cultivator.

Similar letters of reference indicate corresponding parts in the several figures.

The object of the invention is to adapt one and the same implement for the various kinds of work required in the cultivation of crops.

To enable those skilled in the art to fully understand and construct my invention, I will proceed to describe it.

A A, Fig. 1, represent the two handles of the implement; B B, two beams attached to the handles and having their front ends attached to a draft-beam, C. The handles A A extend some distance below the beams B B and form feet $a$ $a$, to which the back shares, D D, are attached. To the back part of the draft-beam C a foot, $b$, is attached, to the lower end of which the front share, E, is secured. (See Fig. 1.) The feet $a$ $a$ $b$ are braced from the beams B B C by rods $c$, in order to secure a requisite degree of strength and stiffness.

The shares D D E are of the usual shovel or cultivator form, and they are attached to the feet by bolts $d$. In case the cultivator is designed for ordinary work—such as pulverizing the earth, eradicating weeds, and the like—the shares D D E are attached directly to the feet square or at right angles by the bolts $d$; but in cultivating what are commonly termed "hoed" crops—that is to say, those which have the earth cast toward and from the plants—keys F are interposed between the shares and feet. These keys F are of metal, slightly curved longitudinally, and of wedge or bevel shape transversely, as shown clearly in Fig. 2. The keys have also holes $e$ made through them to allow the bolts $d$ to pass through, and the upper ends of the keys are each provided with a flange, $f$, which projects over the top edge of its share.

The keys F are beveled in two different directions—right and left—as shown in Figs. 3 and 4, and by interposing these keys between the shares and the feet an oblique position is given the shares either to the right or left, as circumstances may require. If, for instance, the earth is to be thrown from the plants, the keys have their thickest ends inward or toward each other, as shown in Figs. 3 and 4; but if the earth is to be thrown toward the plants the keys are reversed—that is to say, the one seen in Fig. 3 is applied to Fig. 4, and vice versa. This adjustment of the keys reverses the position of the shares D and causes them to have an oblique position inward. The front share, E, may be adjusted by a key in the same way as the shares D D; or it may have a right angular position with its foot $b$, as the office of the share E is merely to pulverize or loosen the soil between the rows.

The flanges $f$ of the keys F form a bearing for the upper ends of the shares and insure their firm connection to the feet.

Having thus described my invention, what I claim as new, and desire to secure by Letters Patent, is—

The employment or use of the curved beveled keys F, interposed between the shares and their feet, and secured by the same bolts, $d$, which attach the shares to the feet, as and for the purpose specified.

ROBT. CRAIG.

Witnesses:
WM. S. LORING,
I. P. PHILLIPS.